(12) United States Patent
Wang et al.

(10) Patent No.: US 8,496,332 B2
(45) Date of Patent: Jul. 30, 2013

(54) ILLUMINATION SYSTEM AND ILLUMINATION CONTROL METHOD

(75) Inventors: Sze-Ke Wang, Hsin-Chu (TW); Chin-Ku Liu, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 588 days.

(21) Appl. No.: 12/761,378

(22) Filed: Apr. 15, 2010

(65) Prior Publication Data
US 2010/0283977 A1 Nov. 11, 2010

(30) Foreign Application Priority Data

May 11, 2009 (TW) .............................. 98115524 A (51) Int. Cl.
*G03B 21/14* (2006.01)
(52) U.S. Cl.
USPC ............................................. 353/84; 348/743
(58) Field of Classification Search
USPC ............... 353/84, 85, 99, 121; 348/742, 743, 348/771; 349/5–9
See application file for complete search history.

(56) References Cited

U.S. PATENT DOCUMENTS

| | | | |
|---|---|---|---|
| 5,774,196 A | 6/1998 | Marshall | |
| 7,172,296 B2 * | 2/2007 | Huibers | 353/99 |
| 7,210,794 B2 * | 5/2007 | Tangen | 353/85 |
| 7,300,162 B2 * | 11/2007 | Huibers | 353/99 |
| 7,762,675 B2 * | 7/2010 | Hoffman | 353/84 |
| 2006/0002109 A1 | 1/2006 | Imade | |
| 2007/0063996 A1 | 3/2007 | Childers | |
| 2007/0064007 A1 | 3/2007 | Childers et al. | |
| 2007/0139617 A1 | 6/2007 | DeCusatis et al. | |

FOREIGN PATENT DOCUMENTS

| | | |
|---|---|---|
| JP | 2006017801 | 1/2006 |
| TW | 200729148 | 8/2007 |
| TW | 200729149 | 8/2007 |
| TW | 200731838 | 8/2007 |

OTHER PUBLICATIONS

"Office Action of Taiwan Counterpart Application", issued on Sep. 26, 2012, p1-p3, in which the listed references were cited.

* cited by examiner

*Primary Examiner* — Seung C Sohn
(74) *Attorney, Agent, or Firm* — Jianq Chyun IP Office (57) ABSTRACT

An illumination system adapted to a projection apparatus is provided, including a light source module, a light color modulating module, and a control unit. The light color modulating module has a plurality of light color modulating units and is disposed in a transmission path of a light beam. The light color modulating module is capable of moving so that the light color modulating units move into the illumination region of the light beam. When the control unit determines that a boundary of any two adjacent light color modulating units has moved into the illumination region of the light beam, the control unit switches the light source module to an off-state. When the boundary of any two adjacent light color modulating units has moved away from the illumination region of the light beam, the control unit switches the light source module to an on-state. An illumination control method is also provided.

20 Claims, 9 Drawing Sheets

ILLUMINATION SYSTEM AND ILLUMINATION CONTROL METHOD

CROSS-REFERENCE TO RELATED APPLICATION

This application claims the priority benefit of Taiwan application serial no. 98115524, filed on May 11, 2009. The entirety of the above-mentioned patent application is hereby incorporated by reference herein and made a part of specification.

BACKGROUND OF THE INVENTION

1. Field of the Invention

The present invention generally relates to a light source and a method of controlling the same. More specifically, the invention relates to an illumination system adapted to a projection apparatus and an illumination control method.

2. Description of Related Art

Conventionally, a projection apparatus provides color images with an illumination system sequentially emitting a red light beam, a green light beam, and a blue light beam to a light valve of the projection apparatus. This allows the projection apparatus to sequentially project red, green, and blue images onto a viewing screen. When red, green, and blue images appear rapidly in succession, due to visual retention in the human eyes, red, green, and blue images mix to form color images. Hence, the conventional projection apparatus provides color images in the above-described fashion.

A conventional illumination system uses an ultra high pressure (UHP) lamp to provide a white light beam and to transmit the white light beam through a rotating color wheel. An example of the color wheel includes an annular filter including red, green, and blue fan-shaped filters. Therefore, white light beams transmitted through the rotating color wheel are sequentially converted into red, green, and blue color light beams, respectively.

However, when the boundaries of different color filters move into the illumination region of the white light beam, i.e. during a spoke time, the white light beam is converted into two different color light beams. Consequently, incorrect colored light beams are transmitted to the light valve and thereby affecting the color accuracy of the images projected onto a viewing screen. For instance, U.S. Patent Application Publication No. 20060002109 disclosed that by continually transmitting white light beams through the color wheel, the white light beams pass through boundaries of different color fan-shaped filters.

U.S. Pat. No. 5,774,196 disclosed shutting off the spatial light modulator (SLM) during the spoke time. Although shutting down the SLM during the spoke time may help to improve the accuracy of the colors displayed on the viewing screen, dark images may be not dark enough, and thus the contrast of the projected images may deteriorate substantially since the light source is still in operation during the shut-off of the SLM. Moreover, a substantial amount of light energy provided by a light source is wasted due to maintaining the on-state of the light source when shutting off the SLM.

On the other hand, Taiwan Patent Publication Nos. 200729148 and 200729149 disclosed shutting off and turning on a light source at various light valve conditions. Although doing so saves energy, neither of the disclosures provides methods for substantially improving the accuracy of the displayed colors during the spoke time.

SUMMARY OF THE INVENTION

The present invention provides an illumination system that may substantially improve the color accuracy of images projected by a projection apparatus, along with substantially better efficiency in using light energy.

The present invention provides an illumination system that may adjust the brightness and the color quality of images projected by the projection apparatus according to a plurality of distinct requirements from different users, along with substantially better efficiency in using light energy.

The present invention provides an illumination control method that substantially improves the color accuracy of images projected by the projection apparatus, along with substantially better efficiency in using light energy.

Other objectives, features, and advantages of the present invention will be further understood from the further technological features disclosed by the embodiments of the present invention In order to achieve one or a portion of or all of the advantages or other advantages, one embodiment of the present invention provides an illumination system adapted to illuminate a light valve of a projection apparatus. The illumination system includes a light source module, a light color modulating module, and a control unit. When the light source module is in an on-state, the light source module emits a light beam, and conversely the light source module does not emit the light beam when the light source module is in an off-state. The light color modulating module is disposed in a transmission path of the light beam. The light color modulating module includes a plurality of light color modulating units, and any two light color modulating units are capable of modulating the color of the light beam into two different colors. The light color modulating module is capable of moving so that the light color modulating units are moved into an illumination region of the light beam in sequence. The control unit is electrically connected to the light source and the light color modulating module. Based on a signal sent from the light color modulating module, the control unit is capable of determining a relative position of the light color modulating module with respect to the light beam. When the control unit determines that a boundary of any two adjacent light color modulating units has moved into the illumination region of the light beam, the control unit switches the light source module to an off-state. When the control unit determines that the boundary of any two adjacent light color modulating units has moved away from the illumination region of the light beam, the control unit switches the light source module to an on-state. A response time of the light source module switching from the on-state to the off-state, added to a response time of the light source module switching from the off-state to the on-state, is less than a time passed while the boundary of any two adjacent light color modulating units moved into and then away from the illumination region of the light beam.

Another embodiment of the present invention provides an illumination system adapted to illuminate a light valve of a projection apparatus. The illumination system includes a light source module, a light color modulating module, and a control unit. When the light source module is in an on-state, the light source module emits a light beam, and conversely the light source module does not emit the light beam when the light source module is in an off-state. The light source module includes a light emitting device. The light color modulating module, disposed in a transmission path of the light beam, includes a plurality of light color modulating units. Any two light color modulating units are capable of modulating the light beam color into two different colors, and the light color modulating module is capable of moving so that the light color modulating units are moved into the illumination region of the light beam in sequence. The light color modulating units include a white light color modulating unit, and the color of the light beam after passing through white light color modulating unit is white. The control unit is electrically connected to the light source module and the light color modulating module. Based on a signal sent from the light color modulating module, the control unit determines a relative position of the light color modulating module with respect to the light beam. The control unit adjusts a turn-on time of a light emitting device when the illumination region of the light beam falls within a region formed by the white light color modulating unit. A response time of the light source module switching from the on-state to the off-state, added to a response time of the light source module switching from the off-state to the on-state, is less than a time passed while the white light color modulating unit moved into and then away from the illumination region of the light beam.

Yet another embodiment of the present invention provides an illumination control method adapted to control an illumination system in a projection apparatus. The illumination system includes a light source module and a light color modulating module. The light source module is capable of emitting a light beam, and the light color modulating module, disposed in the transmission path of the light beam, includes a plurality of light color modulating units. Any two adjacent light color modulating units are capable of modulating the color of the light beam into two different colors, and the light color modulating module is capable of moving so that the light color modulating units are moved into the illumination region of the light beam in sequence. The illumination control method includes the following steps. First, when the illumination region of the light beam falls within a region formed by any one of the light color modulating units, the light source module is switched to an on-state. In addition, when a boundary of any two adjacent light color modulating units move into the illumination region of the light beam, the light source module is switched to an off-state.

In summary, in the illumination systems and the illumination control method of the embodiments of the present invention may have at least one of the following advantages: when the boundary of any two adjacent light color modulating units move into the illumination region of the light beam, the light source module is switched to an off-state. Therefore, a substantial improvement in the color accuracy of the images projected by the projection apparatus is provided, and the light energy provided by the light source module is used efficiently. In the illumination system and illumination control method of the embodiments of the present invention, when the illumination region of the light beam falls within a region formed by the white light color modulating unit, a turn-on time of the light emitting device may be adjusted. Therefore, adjustment of the brightness and color quality of the projected images from the projection apparatus is provided according to different requirements of users, and the light energy provided by the light source module is used efficiently.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

It is to be understood that other embodiment may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings.

Figure 1A:
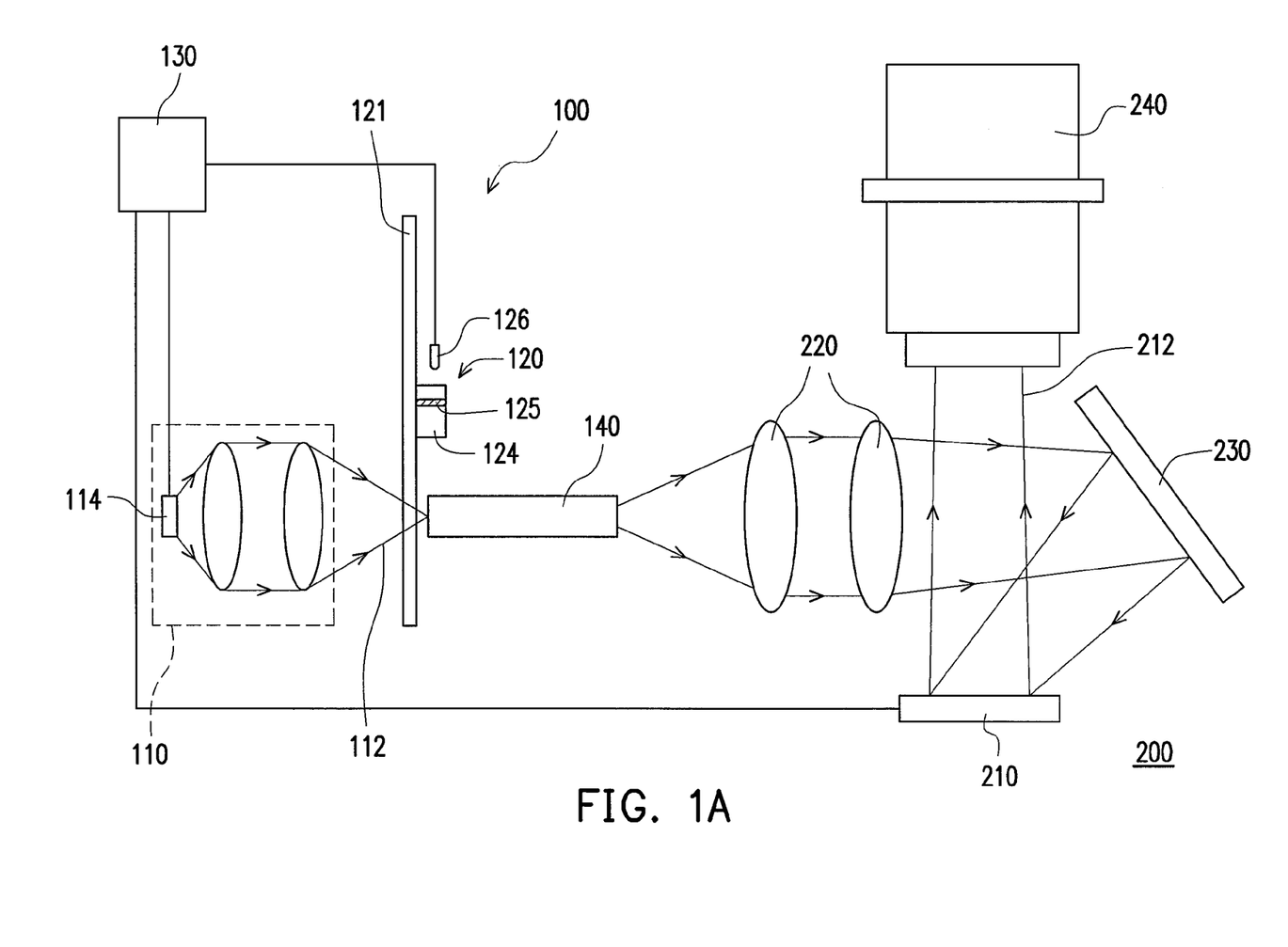
FIG. 1A is a schematic view illustrating the structure of an illumination system adapted in a projection apparatus in accordance with one embodiment of the present invention.
Figure 1B:
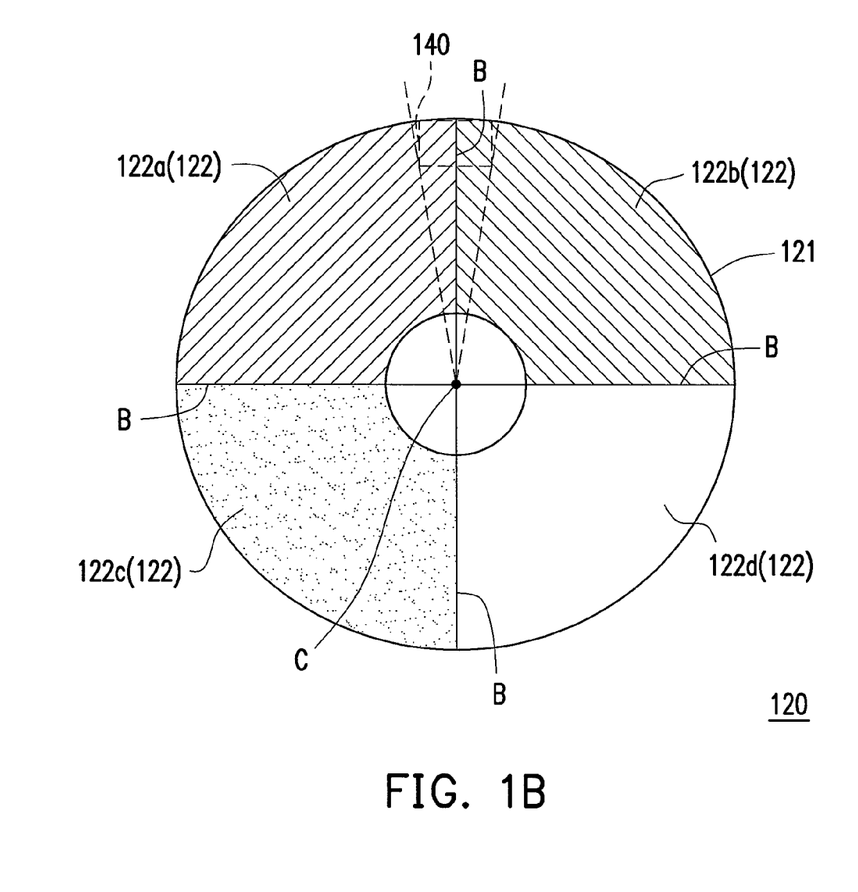
FIG. 1B is a front view of a light color modulating module depicted in FIG. 1A.

FIG. 1A is a schematic view illustrating the structure of an illumination system adapted in a projection apparatus in accordance with one embodiment of the present invention. FIG. 1B is a front view of a light color modulating module depicted in FIG. 1A. Referring to FIG. 1A and FIG. 1B, an illumination system 100 of the present embodiment is adapted to illuminate a light valve 210 of a projection apparatus 200. The illumination system 100 includes a light source module 110, a light color modulating module 120, and a control unit 130. When the light source module 110 is in an on-state, the light source module 110 emits a light beam 112, and conversely the light source module 110 does not emit the light beam 112 when the light source module 110 is in an off-state. The light color modulating module 120 is disposed in a transmission path of the light beam 112. The light color modulating module 120 includes a plurality of light color modulating units 122, wherein any two of these light color modulating units 122 are capable of modulating the color of the light beam 112 into two different colors. The light color modulating module 120 is capable of moving so that the light color modulating units 122 are moved into an illumination region of the light beam 112 in sequence.

In the present embodiment, the light color modulating module 120 includes a color wheel 121, and the color wheel 121 includes the light color modulating units 122. The light color modulating units 122 are disposed around a geometric center C of the color wheel 121, and the color wheel 121 is capable of moving so that the light color modulating units 122 are moved into the illumination region of the light beam 112 in sequence, and thereby the color wheel is capable of modulating the light beam 112 into a plurality of different colors in sequence. In the present embodiment, the illumination system 100 further includes a light integration rod 140 disposed in a transmission path of the light beam 112. In the present embodiment, the light color modulating module 120 is disposed between the light source module 110 and the light integration rod 140. However, in other embodiments of the present invention, the light integration rod 140 may be disposed between the light source module 110 and the light color modulating module 120.

In the present embodiment, the illumination region of the light beam 112, as depicted in FIG. 1B, is defined as a region of the light color modulating module 120 onto which a light entrance of the light integration rod 140 is projected. However, in other embodiments wherein the light integrating rod 140 is disposed between the light source module 110 and the light color modulating module 120, the illumination region of the light beam 112 is defined as a region of the light color modulating module 120 onto which a light exit of the light integration rod 140 is projected. In the embodiment of the present invention, after the light beam 112 is homogenized and shaped by passing through the light integration rod 140, the light beam 112 is projected onto the light valve 210 by lens 220 and reflection mirror 230, and the light valve 210 then reflects and converts the light beam 112 into an image light beam 212. Thereafter, projection lens 240 projects the image light beam 212 onto a screen (not shown) to form an image. In the embodiment of the present invention, the light valve 210 is, for example, a digital micro-mirror device (DMD). However, in other embodiments of the invention, the light valve 210 may also be a liquid-crystal-on-silicon (LCOS) panel.

The control unit 130 is electrically connected to the light source module 110 and the light color modulating module 120. Based on a signal sent from the light color modulating module 120, the control unit is capable of determining a relative position of the light color modulating module 120 with respect to the light beam 112. Specifically, the light color modulating module 120 may further include a rotor 124 and a light detector 126. Rotation of the rotor 124 may drive the color wheel 121 to rotate. The surface of the rotor 124 has a position marker 125, and the light detector 126 is disposed on a side facing the rotor 124. The position marker 125 rotates with the rotor 124, and the light detector 126 senses the position marker 125 and transmits a signal to the control unit 130 when the position marker 125 rotates to a position aligned with the light detector 126. The control unit 130 calculates the relative position of the color wheel 121 with respect to the light beam 112 by taking into account the position marker 125 and the rotational speed of the color wheel 121.

When the control unit 130 determines that the boundary B of any two adjacent light color modulating units 122 has moved into the illumination region of the light beam 112, the control unit 130 switches the light source module 110 to an off-state. When the control unit 130 determines that the boundary B of any two adjacent light color modulating units 122 has moved away from the illumination region of the light beam 112, the control unit 130 switches the light source module 110 to an on-state. A response time of the light source module 110 switching from the on-state to the off-state, added to a response time of the light source module 110 switching from the off-state to the on-state, is less than a time passed while the boundary B of any two adjacent light color modulating units 122 moved into and then away from the illumination region of the light beam 112 (i.e. a spoke time). The off-state mentioned above means a state of the light source module 110 wherein the light emitting device does not emit light, whereas the on-state means a state of the light source module 110 wherein the light emitting device emits light under normal operation.

For example, when the rotational speed of the color wheel 121 is 120 revolutions per second, and the rotational angle of the color wheel 121 is taken to be 12° in the spoke time, then the spoke time is calculated to be approximately 1/3600 second, although the present invention is not limited thereto. In the embodiment of the present invention, the light source module 110 includes a light-emitting diode (LED) 114. Due to rapid response being characteristic to the LED 114, the response time of switching from the on-state to the off-state, added to the response time of switching from the off-state to the on-state, is substantially less than the spoke time. In comparison, because a conventional ultra high pressure lamp light source module has a substantially longer idling time, a response time of switching from an on-state to an off-state, added to a response time of switching from an off-state to an on-state is substantially longer than the spoke time. In the embodiment of the present invention, the LED 114 is, for example, a white LED, and the light beam 112 emitted by the white LED is a white light beam. Furthermore, the light color modulating unit 120 may include a red filter 122a, a green filter 122b, and a blue filter 122c. In the embodiment of the present invention, the light color modulating unit 120 further includes a colorless filter 122d.

Figure 2:
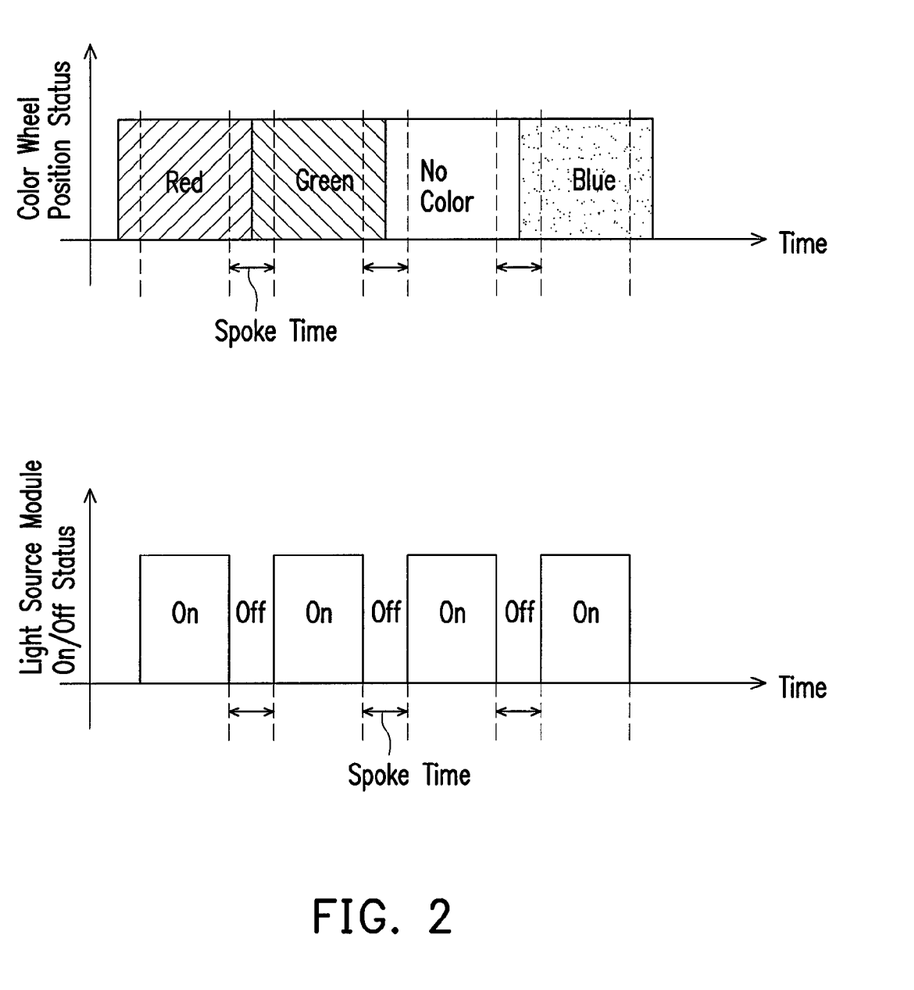
FIG. 2 is a corresponding timing diagram for a color wheel position status and a light source module on-off status.

FIG. 2 is a corresponding timing diagram for a color wheel position status and a light source module on-off status. Referring to FIG. 1A, FIG. 1B, and FIG. 2, as shown in FIG. 2, when the illumination region of the light beam 112 falls within regions respectively formed by the red filter 122a, the green filter 122b, the blue filter 122c, and the colorless filter 122d, the light source module 100 is in the on-state. In addition, when the boundary B moves into the illumination region of the light beam 112, i.e. in the spoke time, the light source module 100 is in the off-state.

In the illumination system 100 of the embodiment of the present invention, the light source module 100 remains in the off-state during the spoke time. Therefore, the problem of two adjacent filters 122 modulating the color of the light beam 112 into two different colors simultaneously is alleviated, and thus the color accuracy of the images projected by the projection apparatus 200 is substantially improved. In addition, due to the light source module 110 being in the off-state during the spoke time, power consumption of the light source module 110 is reduced and thus making the illumination system 100 substantially more energy efficient. Moreover, being in the off-state during the spoke time further decreases heat accumulation of the light source module 110. Consequently, temperature of the LED 114 is reduced so as to reduce the brightness decay of the LED 114 due to heat. Moreover, the operational lifespan of the LED 114 is substantially lengthened. Furthermore, the light source module 110 being switched to an off-state during the spoke time further decreases image brightness of the darker images and thus enhances image contrast.

On the other hand, with power consumption being held equal for the conventional illumination system and the illumination system 100 of the present embodiment, the driving current may be substantially higher due to substantially shorter light emitting durations for the light source module 110. Accordingly, assuming equal power consumption levels, the image brightness provided by the illumination system 100 of the present embodiment may be substantially higher than the image brightness provided by the conventional illumination system.

Figure 3:
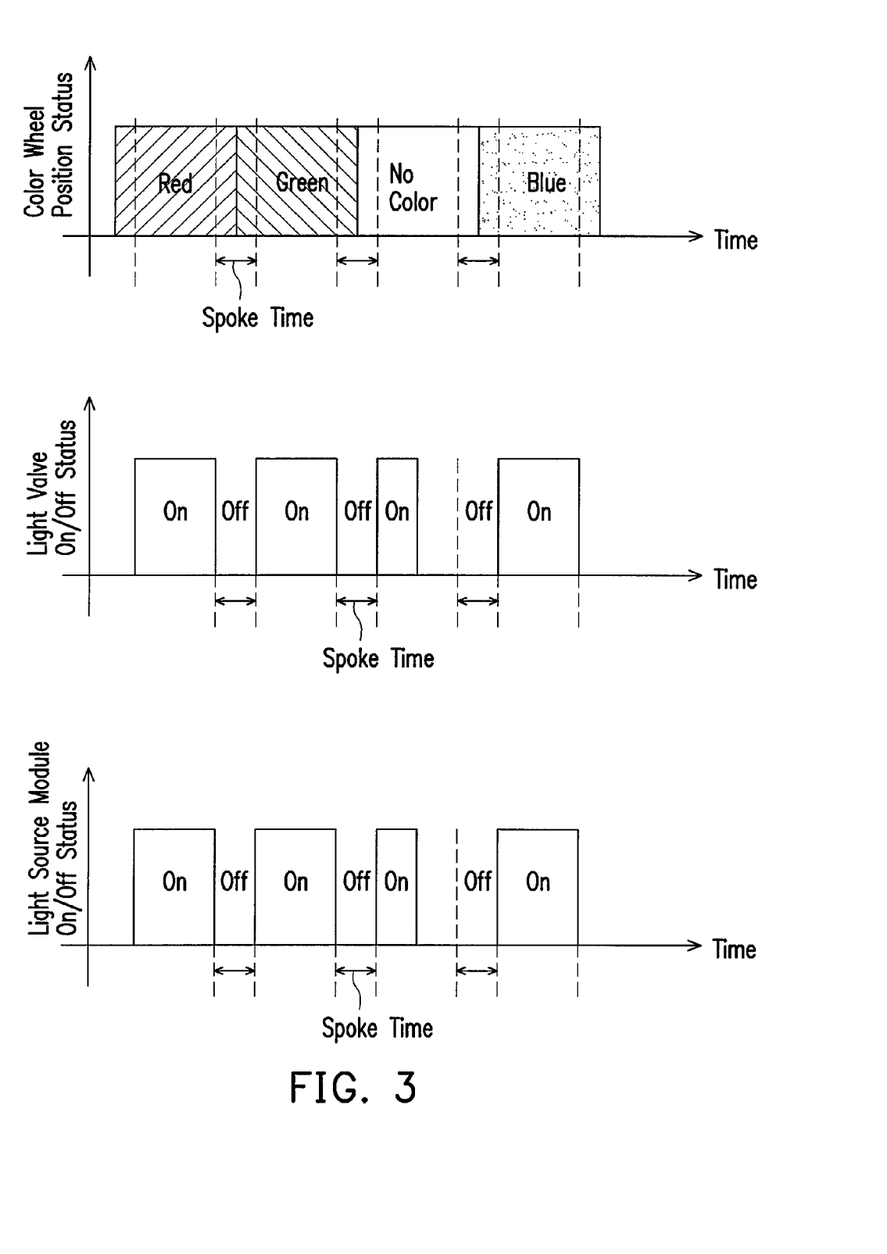
FIG. 3 is a corresponding timing diagram for a color wheel position status, a light valve on/off status, and a light source module on/off status of the illumination system depicted in FIG. 1A operating in another mode.

FIG. 3 is a corresponding timing diagram for a color wheel position status, a light valve on/off status, and a light source module on/off status of the illumination system depicted in FIG. 1A operating in another mode. Referring to FIG. 1A, FIG. 1B, and FIG. 3, the light source module 110 includes a light emitting device (i.e. the LED 114 in the present embodiment). The light color modulating units 122 includes a white light color modulating unit (the colorless filter 122d in the present embodiment), and the color of the light beam 112 after passing through the white light color modulating unit is white. Furthermore, the control unit 130 adjusts a turn-on time of the light emitting device when the illumination region of the light beam 112 falls within a region formed by the white light modulating unit. As shown in FIG. 3, in a time interval when the illumination region of the light beam 112 falls within a region formed by the colorless filter 122d, the light source module 110 is in the on-state during a part of the time interval. The length of the part of the time interval may be adjusted, and in other modes of operation, the light source module 110 may be switched to the off-state during the time interval. Therefore, the image brightness and color quality may be adjusted according to each distinct needs of users.

For example, if the projection apparatus 200 is used for projecting text reports, wherein the color saturation requirements may be not high, then as illustrated in FIG. 2, to increase image brightness, the light source module 110 may be maintained in the on-state while the illumination region of the light beam 112 falls within a region formed by the colorless filter 122d. However, if the projection apparatus 200 is used to show films, wherein the color saturation requirements may be comparatively higher, then the light source module 110 may be switched to the off-state while the illumination region of the light beam 112 falls within the region formed by the colorless filter 122d. Furthermore, if the color saturation and brightness requirements are between the confines of the two examples aforementioned, then as shown in FIG. 3, the light source module 110 may be maintained in the on-state in a part of the time interval when the illumination region of the light beam 112 falls within the region formed by the colorless filter 122d. In addition, by switching the light source module 110 to an off-state in a part or all of the time interval when the illumination region of the light beam 112 falls within the region formed by the colorless filter 122d, power consumption is saved.

In the embodiment of the present invention, the control unit 130 may be electrically connected to the light valve 210. As shown in FIG. 3, the control unit 130 may switch the light valve 210 and the light source module 110 to the off-state simultaneously in order to achieve substantially higher image contrast and save energy.

In other embodiments of the illumination system, the light source module 110 may not need to be switched to the off-state during the spoke time, and the control unit 130 adjusts the turn-on time of the light emitting device when the illumination region of the light beam 112 falls within a region formed by the white light modulating unit. Furthermore, the response time of the light source module 110 switching from the on-state to the off-state, added to the response time of the light source module 110 switching from the off-state to the on state, is less than the time passed while the white light modulating unit moved into and then away from the illumination region of the light beam 112. For example, supposing the rotational speed of the color wheel 121 is 120 revolutions per second and the angular range of the colorless filter 122d is 105°, the time passed while the colorless filter 122d moved into then away from the illumination region of the light beam 112 is calculated to be $1/412$ second, although the present invention is not limited thereto.

Figure 4:
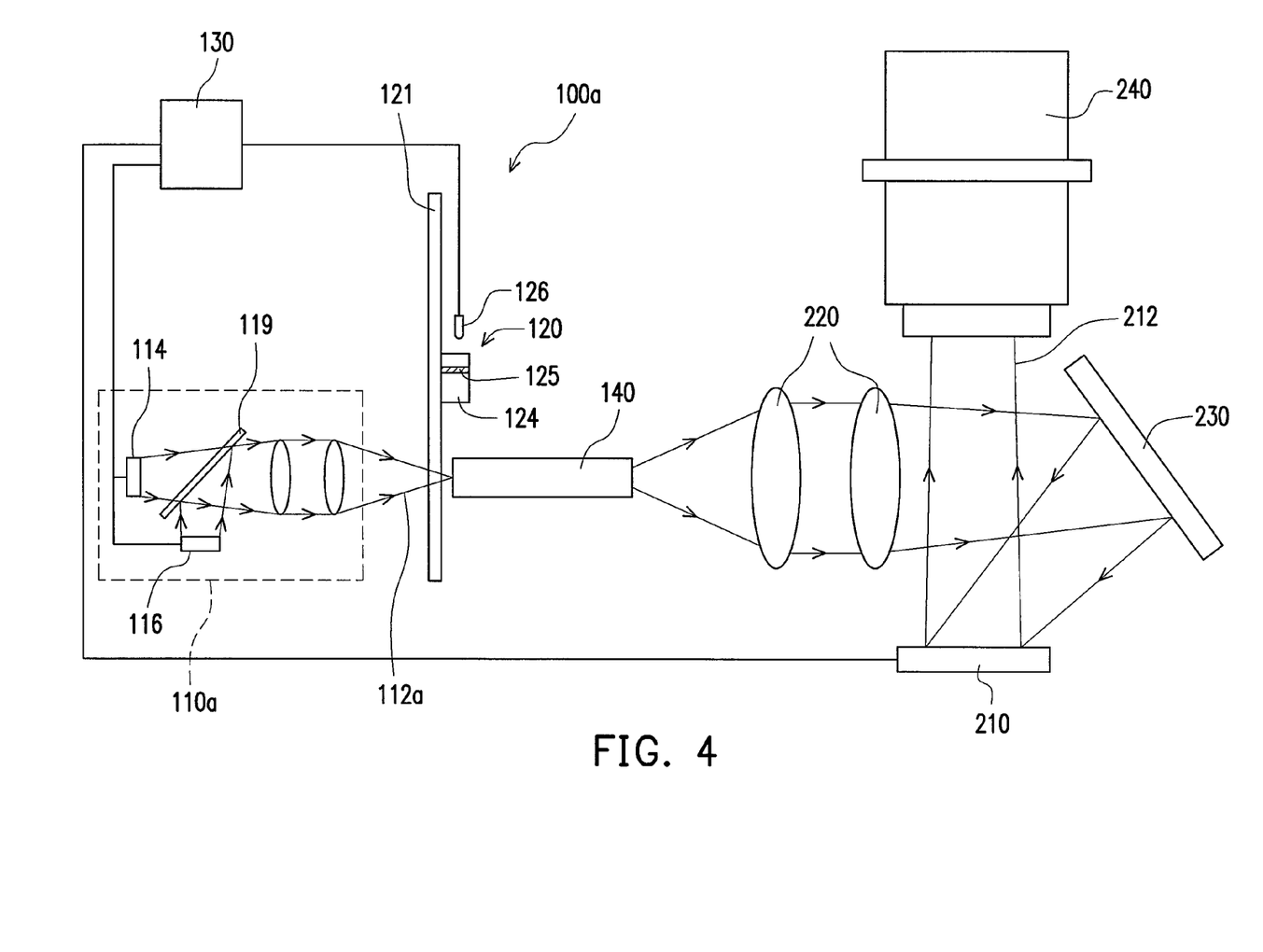
FIG. 4 is a schematic view illustrating the structure of an illumination system adapted to a projection apparatus in accordance with another embodiment of the present invention.

FIG. 4 is a schematic view illustrating the structure of an illumination system adapted to a projection apparatus in accordance with another embodiment of the present invention. Referring to FIG. 4, the illumination system 100a of the present embodiment is similar to the aforementioned illumination system 100 (depicted in FIG. 1A). The dissimilarities are described below. In the illumination system 100a of the present embodiment, the light source module 110a includes a plurality of LEDs such as the LED 114 and LED 116. At least one of the LED 114 and LED 116 is a white LED (e.g. the white LED being LED 114), and at least another one of the LED 114 and LED 116 is a non-white LED (e.g. the non-white LED being LED 116). In the embodiment of the present invention, the non-white is, for example, red, and a color-combination device 119 may be used to combine the white light beam emitted by LED 114 and the red light beam emitted by LED 116 into a light beam 112a. The color-combination device 119 is, for example, a dichroic mirror, a neutral density filter, a polarizing beam splitter (PBS), or other suitable color-combination devices.

Referring to FIG. 1B and FIG. 4, the light color modulating units 122 may include the colorless filter 122d. When the illumination region of the light beam 112a falls within a region formed by the colorless filter 122d, the control unit 130 switches the white LED (e.g. LED 114) to the on-state in a first time interval, and the control unit 130 switches the non-white LED (e.g. LED 116 that is emitting red light) to the on-state in a second time interval. The first time interval fully coincide with, partially overlap, or does not overlap the second time interval.

Figure 5:
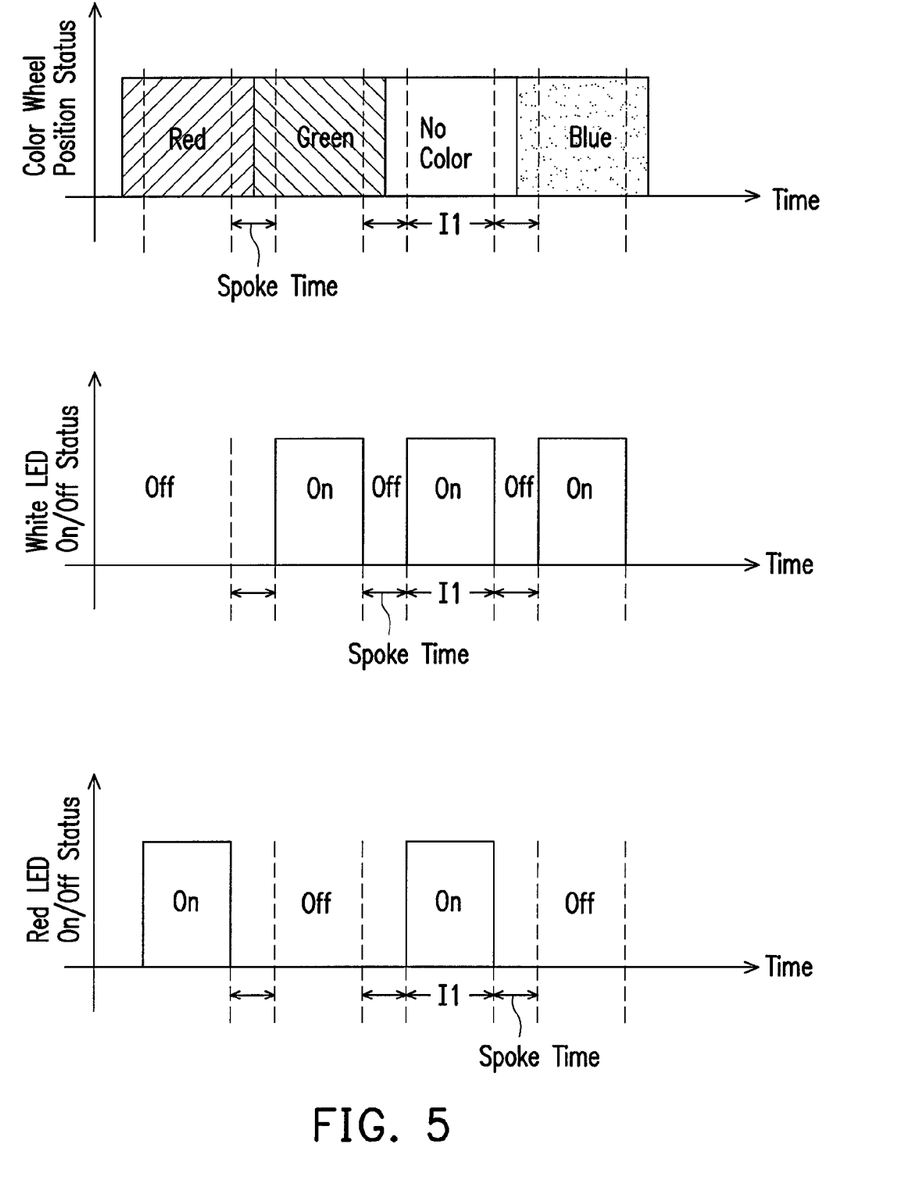
FIG. 5 is a corresponding timing diagram for a color wheel position status of the color wheel, a white LED on/off status, and a red LED on/off status depicted in FIG. 4.

FIG. 5 is a corresponding timing diagram for a color wheel position status of the color wheel, a white LED on/off status, and a red LED on/off status depicted in FIG. 4. Referring to FIG. 1B, FIG. 4, and FIG. 5, in the embodiment of the present invention, the aforementioned first time interval fully coincides with the aforementioned second time interval, as depicted in interval I1 of FIG. 5.

Referring to FIG. 1B, FIG. 4, and FIG. 5, in the embodiment of the present invention, the light color modulating units 122 may further include a non-white filter, for instance a red filter 122a. When the illumination region of the light beam 112a falls within a region formed by the non-white filter (e.g. red filter 122a), the control unit 130 switches the non-white LED (e.g. LED 116 emitting red light) to the on-state and switches the white LED (e.g. LED 114) to the off-state. In other embodiments of the present invention, the aforementioned non-white may also be green, blue, or other suitable colors.

In the illumination system of other embodiments, during the spoke time, the light source module 110a may not need to be switched to the off-state, and the control unit 130 adjusts the turn-on time of the light emitting device when the illumination region of the light beam 112a falls within a region formed by the white light modulating unit. Furthermore, the response time of the light source module 110 switching from the on-state to the off-state, added to the response time of the light source module 110 switching from the off-state to the on state, is less than a time passed while the white light modulating unit moved into and then away from the illumination region of the light beam 112.

Figure 6:
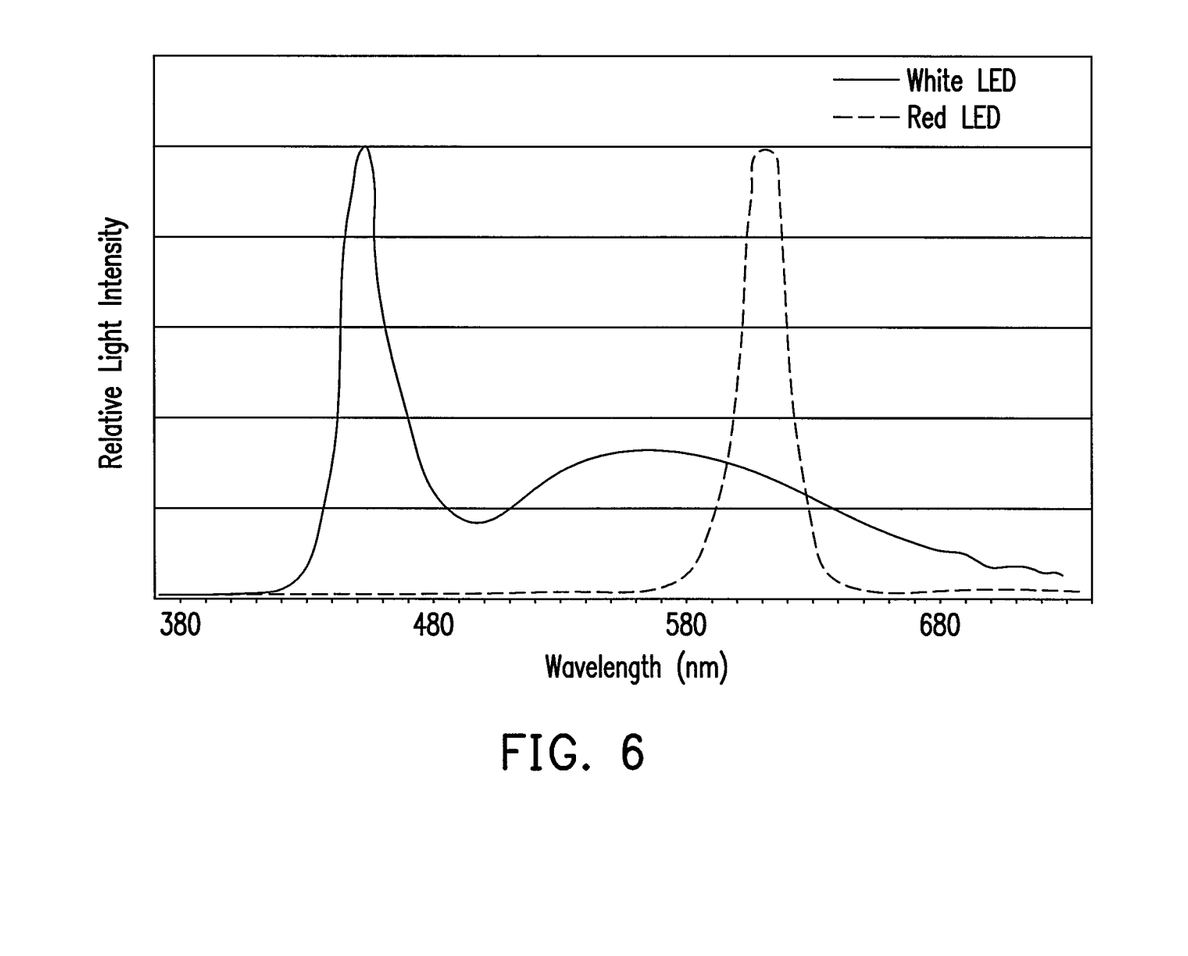
FIG. 6 is a spectrum diagram of a white LED and a red LED.

FIG. 6 is a spectrum diagram of a white LED and a red LED. Referring to FIGS. 4 to 6, as shown in FIG. 6, the white light emitted by the white LED has lower light intensity in the red wavelength region. Therefore, if the white LED and the red LED are switched to the on-state simultaneously in the time interval I1, the foregoing low intensity problem of the white LED at the red wavelength region may be substantially alleviated. Hence, the illumination system 100a may provide substantially more accurate white light, and thereby also provide substantially more accurate colors in the projected images.

Figure 7:
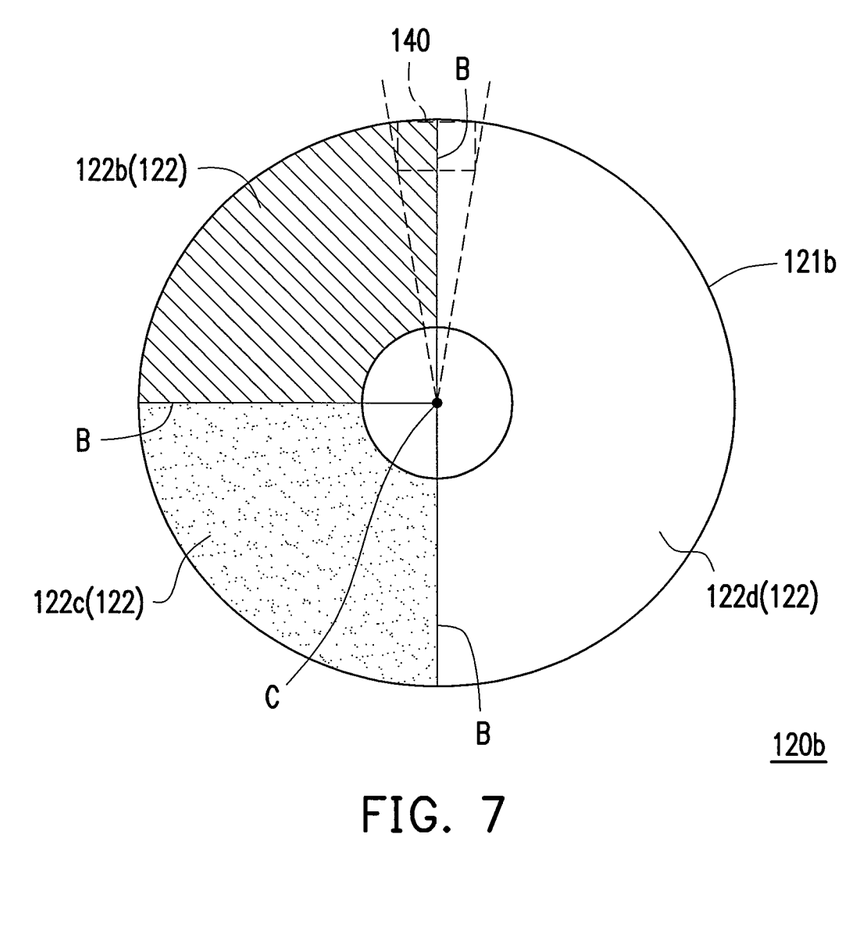
FIG. 7 is a front view illustrating a light color modulating module for an illumination system in accordance with another embodiment of the present invention.
Figure 8:
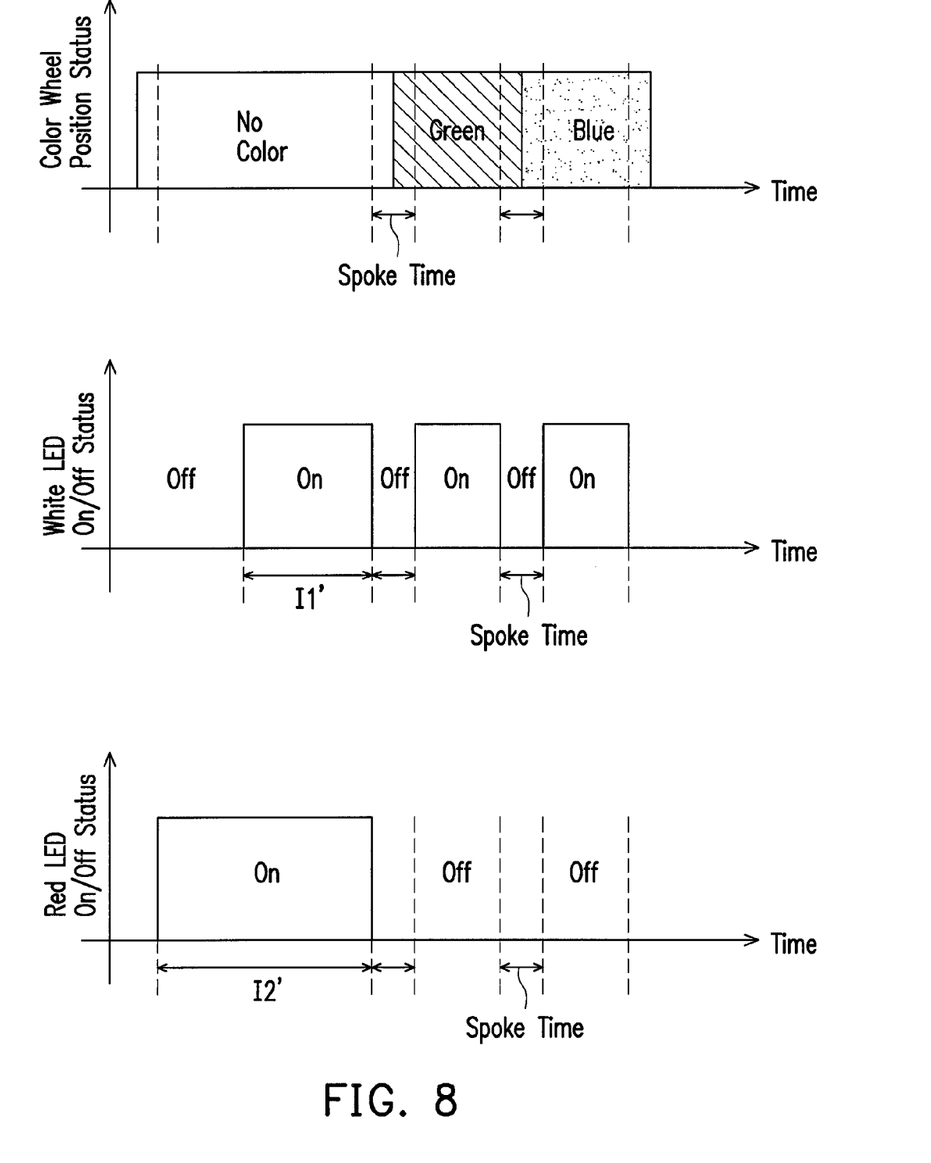
FIG. 8 is a corresponding timing diagram for a color wheel position status of the color wheel depicted in FIG. 7, a white LED on/off status, and a red LED on/off status.

FIG. 7 is a front view illustrating a light color modulating module of an illumination system in accordance with another embodiment of the present invention. FIG. 8 is a corresponding timing diagram for a color wheel position status of the color wheel depicted in FIG. 7, a white LED on/off status, and a red LED on/off status. The illumination system in the present embodiment is similar to the illumination system 100a shown in FIG. 4, and the differences between the two systems include the different light color modulating units used, along with different turn-on times for the white LED and the red LED. Referring to FIG. 7 and FIG. 8, in comparison to the color wheel 121 depicted in FIG. 1B, the color wheel 121b of the light color modulating module 120b does not have a red filter 122a (as shown in FIG. 1B). In addition, when the illumination region of the light beam 112 falls within a region formed by the colorless filter 122d, a first time interval I1' when the white LED is in the on-state partially overlaps with a second time interval I2' when the red LED is in the on-state. When the red LED is in the on-state but the white LED is in the off-state, the red light beam emitted by the red LED transmits through the colorless filter 122d, and thus the color of the light beam projected onto the light valve is red. On the other hand, when both the red LED and the white LED are simultaneously switched to the on-state, then the color accuracy of the white light beam is substantially improved.

Notably, in the present invention, the light source module 110a is not limited to having white light emitting devices or white LEDs. In other embodiments of the present invention, the white LED depicted in FIG. 1A may be replaced by an ultraviolet LED, while the red filter 122a, the green filter 122b, the blue filter 122c, and the colorless filter 122d may each be replaced by a red fluorescent sheet, a green fluorescent sheet, a blue fluorescent sheet, and a white fluorescent sheet, respectively. An ultraviolet light beam emitted by the ultraviolet LED is converted into a red, a green light beam, a blue light beam, and a white light beam after passing through the red fluorescent sheet, the green fluorescent sheet, the blue fluorescent sheet, and the white fluorescent sheet, respectively. A conventional method for forming a fluorescent sheet includes coating fluorescent powders or fluorescent materials on a surface of a transparent substrate, or doping the transparent substrate with the same substance. In other words, the light beam emitted by the light source module may be an ultraviolet light beam, the light color modulating unit may include a plurality of fluorescent sheets, and the ultraviolet light beam after passing through the fluorescent sheets is converted into a light beam having a plurality of possible colors.

In another embodiment of the present invention, the white LED depicted in FIG. 1 may be replaced by a blue LED, and the light color modulating unit includes a filter, a red fluorescent sheet, and a green fluorescent sheet. Some examples of the filter include a colorless filter or a blue filter. A blue light beam emitted by the blue LED passes through the filter. The blue light beam emitted by the blue LED is converted into a red light beam and a green light beam after passing through the red fluorescent sheet and the green fluorescent sheet, respectively. In another embodiment of the present invention, the light color modulating units may further include a white fluorescent sheet for converting the blue light beam into a white light beam.

In another embodiment of the present invention, the white LED depicted in FIG. 4 may be replaced by the ultraviolet LED, and the green filter 122b, the blue filter 122c, and the colorless filter 122d depicted in FIG. 1B may be replaced by the green fluorescent sheet, the blue fluorescent sheet, and the white fluorescent sheet, respectively. When the illumination region of the light beam emitted by the light source module falls within a region formed by the green fluorescent sheet, the blue fluorescent sheet, or the white fluorescent sheet, the control unit switches the ultraviolet LED to an on-state and switches the red LED (e.g. LED 116) to an off-state. In addition, when the illumination region of the light beam emitted by the light source module falls within a region formed by the red filter 122a (depicted in FIG. 1B), the control unit switches the red LED to the on-state and switches the ultraviolet LED to the off-state. In other words, the light source module may include an ultraviolet LED and a visible LED, and the light color modulating units may include at least a fluorescent sheet and at least a filter. When the illumination region of the light beam falls within a region formed by the fluorescent sheet, the control unit switches the ultraviolet LED to the on-state and switches the visible LED to the off-state. When the illumination region of the light beam falls within a region of the filter, the control unit switches the visible LED to the on-state and switches the ultraviolet LED to the off-state. Therefore, in another embodiment of the present invention, the red LED depicted in FIG. 4 (e.g. LED 116) may be replaced by the ultraviolet LED, and the red filter, the green filter, and the blue filter depicted in FIG. 1B may be replaced by a red fluorescent filter, a green fluorescent filter, and a blue fluorescent filter respectively.

In another embodiment of the present invention, the white LED depicted in FIG. 1A (e.g. LED 114) may be replaced by a red LED, a green LED, and a blue LED, wherein white light is formed by means of a color-combination device.

In another embodiment of the present invention, an illumination control method adapted to control the above illumination systems, such as the illumination system 100 in FIG. 1A, is provided. Referring to FIG. 1A, FIG. 1B, and FIG. 2, the illumination control method of the embodiment of the present invention includes the following steps. First, when the illumination region of the light beam 112 falls within a region formed by any one of the light color modulating units 122, the light source module 110 is switched to the on-state. In addition, when the boundary B of any two adjacent light color modulating units 122 moves into the illumination region of the light beam 112, the light source module 110 is switched to the off-state. The advantages and effects achieved by the illumination control are substantially equal to the advantages and effects achieved by the foregoing illumination system 100, and therefore no further description will be repeated herein.

In another embodiment of the present invention, the illumination control method for controlling the above illumination system, such as the illumination system 100 in FIG. 1A, is provided. Referring to FIG. 1A, FIG. 1B, and FIG. 3, at least one of the light color modulating units 122 is a colorless filter (e.g. the colorless filter 122d depicted in FIG. 1B), and the light source module 110 includes a white light emitting device (e.g. light emitting device 112 depicted in FIG. 1A). The illumination control method of the present embodiment includes adjusting the turn-on time of the white light emitting device when the illumination region of the light beam 112 falls within a region formed by the colorless filter 122d. In addition, in the embodiment of the present invention, the illumination control method further includes switching the light emitting device (e.g. LED 114) to the on-state when the illumination region of the light beam 112 falls within a region formed by any of the light color modulating units 122 (e.g. red, green, blue filters 122a, 122b, and 122c) other than the white light color modulating unit (e.g. colorless filter 122d depicted in FIG. 1B).

In another illumination control method according to another embodiment of the present invention, at least one of the light color modulating units 122 is, for example, a white fluorescent sheet. For instance, the colorless filter 122d depicted in FIG. 1B is replaced by the white fluorescent sheet. The light source module 110 includes, for example, an ultraviolet light emitting device. For instance, the light emitting device 114 depicted in FIG. 1A is replaced by the ultraviolet light emitting device. The illumination control method of the present embodiment includes adjusting the turn-on time of the ultraviolet light emitting device when the illumination region of the light beam 112 falls within a region formed by the white fluorescent sheet.

In another embodiment of the present invention, the illumination control method may be implemented to control the illumination systems of the foregoing embodiments (e.g. the illumination system 100a depicted in FIG. 4 or the illumination system using the light color modulating module 120b depicted in FIG. 7). Referring to FIG. 1B, FIG. 4, FIG. 5, and FIG. 8, the illumination control method of the present embodiment further includes switching the white light emitting device (e.g. the white LED 114) to the on-state during a first time interval and switching the non-white light emitting device (e.g. the red LED 116) to the off-state during a second time interval when the illumination region of the light beam 112a falls within a region formed by the colorless filter 122d. The first time interval fully coincides with (depicted in FIG. 5), partial overlaps (depicted in FIG. 8), or does not overlap the second time interval.

When the illumination control method of the present embodiment is implemented in the illumination system 100a depicted in FIG. 4, the illumination control method may further include switching the non-white light emitting device (e.g. the red LED 116) to the on-state and switching the white light emitting device (e.g. the white LED 114) to the off-state when the illumination region of the light beam 112a falls within a region of the non-white filter (e.g. red filter 122a).

In summary, the embodiment or embodiments of the invention may have at least one of the following advantages. In the illumination system and the illumination control method of the embodiments of the present invention, the light source module is switched to the off-state when the boundary of any two adjacent light color modulating units move into the illumination region of the light beam (i.e. in the spoke time). Therefore, a substantial improvement in the color accuracy of the projected images is provided while efficiently using the light energy provided by the light source module. In the illumination system and the illumination control method of the embodiments of the present invention, when the illumination region of the light beam falls within a region formed by the white light color modulating unit, the turn-on time of the light emitting device may be adjusted. Therefore, adjustment of the brightness and the color quality of the images projected by the projection apparatus is provided according to different requirements of users, while also efficiently using the light energy provided by the light source module. In the illumination system and the illumination control method of the embodiments of the present invention, non-white LEDs may be used to supplement the white LED to substantially improve the light intensity at certain wavelengths. Furthermore, when the light beam is illuminated on the colorless filter, the non-white LED and the white LED are switched to the on-state, thereby substantially increasing the color accuracy of the images projected by the projection apparatus.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. An illumination system adapted to illuminate a light valve of a projection apparatus, the illumination system comprising:
    a light source module, wherein the light source module emits a light beam during an on-state of the light source module and does not emit the light beam during an off-state of the light source module;
    a light color modulating module comprising a plurality of light color modulating units and disposed in a transmission path of the light beam, wherein any two adjacent light color modulating units are capable of modulating the color of the light beam into two different colors, and the light color modulating module is capable of moving so that the light color modulating units are moved into an illumination region of the light beam in sequence; and
    a control unit electrically connected to the light source module and the light color modulating module, wherein the control unit determines a relative position of the light color modulating module with respect to the light beam based on a signal sent from the light color modulating module, the control unit switches the light source module to the off-state when the control unit determines that a boundary of any two adjacent light color modulating units has moved into the illumination region of the light beam, and the control unit switches the light source module to the on-state when the control unit determines that the boundary of any two adjacent light color modulating units has moved away from the illumination region of the light beam, wherein a response time of the light source module switching from the on-state to the off-state, added to a response time of the light source module switching from the off-state to the on-state, is less than a time passed while the boundary of any two adjacent light color modulating units moved into and then away from the illumination region of the light beam.

2. The illumination system as claimed in claim 1, wherein the light color modulating module comprises a color wheel having the light color modulating units, wherein the light color modulating units are disposed around a geometric center of the color wheel, and the color wheel is capable of rotating for making the light color modulating units move into the illumination region of the light beam in sequence.

3. The illumination system as claimed in claim 1, wherein the light source module comprises a light-emitting diode capable of emitting a white light beam, and the light color modulating units comprise a red filter, a green filter, and a blue filter.

4. The illumination system as claimed in claim 3, wherein the light color modulating units further comprise a colorless filter.

5. The illumination system as claimed in claim 1, wherein the light source module comprises a plurality of light-emitting diodes, at least one of the light-emitting diodes is a white light-emitting diode, and at least another one of the light-emitting diodes is a non-white light-emitting diode, and the light color modulating units comprise a colorless filter, wherein the control unit switches the white light-emitting diode to an on-state during a first time interval and switches the non-white light-emitting diode to an on-state during a second time interval, and the first time interval fully coincides with, partially overlaps, or does not overlap the second time interval when the illumination region of the light beam falls within a region formed by the colorless filter.

6. The illumination system as claimed in claim 5, wherein the light color modulating units further comprise a non-white filter, wherein the control unit switches the non-white light-emitting diode to the on-state and switches the white light-emitting diode to an off-state when the illumination region of the light beam falls within a region formed by the non-white filter.

7. The illumination system as claimed in claim 5, wherein the non-white is red, green, or blue.

8. The illumination system as claimed in claim 1, wherein the light beam emitted by the light source module is an ultraviolet light beam, and the light color modulating units comprise a plurality of fluorescent sheets to convert the ultraviolet light beam into a plurality of different color light beams after the ultraviolet light beam passes through the fluorescent sheets.

9. The illumination system as claimed in claim 1, wherein the light source module comprises an ultraviolet light-emitting diode and a visible light-emitting diode, and the light color modulating units comprise at least one fluorescent sheet and a color filter; the control unit switches the ultraviolet light-emitting diode to an on-state and switches the visible light-emitting diode to an off-state when the illumination region of the light beam falls within a region formed by the fluorescent sheet, and the control unit switches the visible light-emitting diode to the on-state and switches the ultraviolet light-emitting diode to the off-state when the illumination region of the light beam falls within a region formed by the color filter.

10. The illumination system as claimed in claim 1, wherein the light source module comprises a blue light-emitting diode, the light color modulating units comprise a color filter, a red fluorescent sheet, and a green fluorescent sheet, and a blue light beam emitted by the blue light-emitting diode is capable of passing through the color filter.

11. The illumination system as claimed in claim 1, wherein the light source module comprises a light emitting device, the light color modulating units comprise a white light color modulating unit, wherein the color of the light beam after passing through the white light color modulating unit is white, and the control unit adjusts a turn-on time for the light emitting device when the illumination region of the light beam falls within a region formed by the white light color modulating unit.

12. An illumination system adapted to illuminate a light valve of a projection apparatus, the illumination system comprising:

a light source module, wherein the light source module emits a light beam during a turn-on state of the light source module and does not emit the light beam during a turn-off state of the light source module, and the light source module comprises a light emitting device;

a light color modulating module disposed in a transmission path of the light beam and comprising a plurality of light color modulating units, wherein any two adjacent light color modulating units are capable of modulating the color of the light beam into two different colors, and the light color modulating module is capable of moving so that the light color modulating units are moved into an illuminating region of the light beam in sequence; and the light color modulating units has a white light color modulating unit, wherein the color of the light beam after passing through the white light color modulating unit is white; and a control unit electrically connected to the light source module and the light color modulating module, wherein the control unit determines a relative position of the light color modulating module with respect to the light beam based on a signal sent from the light color modulating module, and the control unit adjusts a turn-on time for the light emitting device when the illumination region of the light beam falls within a region formed by the white light color modulating unit, wherein a response time of the light source module switching from the on-state to the off-state, added to a response time of the light source module switching from the off-state to the on-state, is less than a time passed while the white light color modulating unit moved into and then away from the illumination region of the light beam.

13. The illumination system as claimed in claim 12, wherein the light emitting device is a white light emitting device, the white light color modulating unit is a colorless filter, and the light source module further comprises a non-white visible light emitting device; the control unit switches the white light emitting device to an on-state during a first time interval and switches the non-white visible light emitting device to an on-state during a second time interval; and the first time interval fully coincides with, partially overlaps, or does not overlap the second time interval when the illumination region of the light beam falls within a region formed by the colorless filter.

14. The illumination system as claimed in claim 13, wherein the light color modulating units further comprise a non-white filter, wherein the control unit switches the non-white visible light emitting device to the on-state and switches the white light emitting device to the off-state when the illumination region of the light beam falls within a region formed by the non-white filter.

15. The illumination system as claimed in claim 12, wherein the light emitting device is an ultraviolet light emitting device, and the white light color modulating unit is a white fluorescent sheet.

16. An illumination control method adapted to control an illumination system of a projection apparatus, the illumination system comprising a light source module and a light color modulating module, wherein the light source module is capable of emitting a light beam, the light color modulating module is disposed in the transmission path of the light beam, the light color modulating module comprises a plurality of light color modulating units wherein any two adjacent light color modulating units are capable of modulating the color of the light beam into two different colors, the light color modulating module is capable of moving so that the light color modulating units are moved into an illumination region of the light beam in sequence, and the illumination control method comprising:
　　switching the light source module to an on-state when the illumination region of the light beam falls within a region formed by any one of the light color modulating units; and
　　switching the light source module to an off-state when a boundary of any two adjacent light color modulating units moves into the illumination region of the light beam.

17. The illumination control method as claimed in claim 16, wherein at least one of the light color modulating units is a white fluorescent sheet, and the light source module comprises an ultraviolet light emitting device, and the illumination control method further comprising adjusting a turn-on time of the ultraviolet light emitting device when the illumination region of the light beam falls within a region formed by the white fluorescent sheet.

18. The illumination control method as claimed in claim 16, wherein at least one of the light color modulating units is a colorless filter, the light source module comprises a white light emitting device, and the illumination control method further comprising adjusting a turn-on time of the white light emitting device when the illumination region of the light beam falls within a region formed by the colorless color filter.

19. The illumination control method as claimed in claim 16, wherein the light source module further comprises a non-white light emitting device, and the illumination control method further comprising:
　　switching the white light emitting device to an on-state in a first time interval and switching the non-white emitting device to an on-state in a second time interval when the illumination region of the light beam falls within a region formed by the colorless filter, wherein the first time interval fully coincides with, partially overlap, or does not overlap the second time interval.

20. The illumination control method as claimed in claim 19, wherein at least one of the light color modulating units is a non-white filter, and the illumination control method further comprising:
　　switching the non-white light emitting device to the on-state and switching the white light emitting device to an off-state when the illumination region of the light beam falls within a region formed by the non-white filter.

* * * * *